US011159069B2

(12) United States Patent
Pal (10) Patent No.: US 11,159,069 B2
(45) Date of Patent: Oct. 26, 2021

(54) EMBEDDED LIQUID COOLED ROTOR COOLING (71) Applicant: Hamilton Sundstrand Corporation, Charlotte, NC (US)

(72) Inventor: Debabrata Pal, Hoffman Estates, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 324 days.

(21) Appl. No.: 16/151,517

(22) Filed: Oct. 4, 2018

(65) Prior Publication Data

US 2020/0112217 A1 Apr. 9, 2020

(51) Int. Cl.
*H02K 1/32* (2006.01)
*H02K 3/24* (2006.01)
*H02K 9/00* (2006.01)

(52) U.S. Cl.
CPC ............... *H02K 1/32* (2013.01); *H02K 3/24* (2013.01); *H02K 9/00* (2013.01)

(58) Field of Classification Search
CPC .. H02K 1/32; H02K 9/00; H02K 3/24; H02K 2201/03; H02K 3/527; H02K 1/24; H02K 1/325; H02K 9/19
See application file for complete search history.

(56) References Cited

U.S. PATENT DOCUMENTS

| | | | |
|---|---|---|---|
| 3,249,775 A | 5/1966 | Baylac | |
| 4,990,810 A * | 2/1991 | Newhouse | H02K 3/527 310/179 |
| 6,054,790 A * | 4/2000 | Kjeer | H02K 3/527 310/214 |
| 6,113,024 A * | 9/2000 | Pittard | H02K 3/527 242/433 |
| 6,759,781 B1 * | 7/2004 | Bushko | H02K 55/04 310/208 |
| 7,061,154 B2 * | 6/2006 | McDowall | H02K 3/527 310/214 |
| 7,821,171 B2 * | 10/2010 | Lemmers, Jr. | H02K 3/527 310/214 |
| 8,018,114 B2 * | 9/2011 | Rasmussen | H02K 3/487 310/214 |
| 9,653,958 B2 * | 5/2017 | Patel | H02K 3/527 |
| 2003/0048015 A1 | 3/2003 | Tornquist et al. | |

(Continued)

FOREIGN PATENT DOCUMENTS

| | | |
|---|---|---|
| WO | 2004/025810 | 3/2004 |
| WO | 2015/034544 | 3/2015 |

OTHER PUBLICATIONS

Extended European Search Report dated Feb. 17, 2020, issued during the prosecution of European Patent Application No. EP 19201091.6.

*Primary Examiner* — Mohamad A Musleh
(74) *Attorney, Agent, or Firm* — Locke Lord LLP; Joshua L. Jones; Scott D. Wofsy (57) ABSTRACT A rotor for an electrical machine includes a core including a plurality of rotor poles circumferentially spaced apart from one another about a hub. A winding is wound about the rotor poles. The winding passes longitudinally through a respective winding gap between each circumferentially adjacent pair of rotor poles. A cooling tube extends through at least one of the respective winding gaps.

18 Claims, 5 Drawing Sheets (56) References Cited

U.S. PATENT DOCUMENTS

| | | | | |
|---|---|---|---|---|
| 2007/0090701 A1* | 4/2007 | Down | ............... | H02K 7/04 |
| | | | | 310/51 |
| 2010/0133946 A1* | 6/2010 | Lemmers, Jr. | ......... | H02K 3/527 |
| | | | | 310/214 |
| 2010/0320860 A1* | 12/2010 | Patel | ............... | H02K 3/527 |
| | | | | 310/194 |
| 2016/0020673 A1* | 1/2016 | Pal | ............... | H02K 9/19 |
| | | | | 310/54 |
| 2016/0211716 A1* | 7/2016 | Patel | ............... | H02K 3/527 |
| 2016/0329765 A1* | 11/2016 | Pal | ............... | H02K 3/38 |

* cited by examiner

EMBEDDED LIQUID COOLED ROTOR COOLING

BACKGROUND OF THE INVENTION

1. Field of the Invention

The present disclosure relates to electrical machines, and more particularly to cooling for electrical machines.

2. Description of Related Art

Traditionally, liquid cooled rotors such as in generators and motors are cooled by end spray cooling or conduction cooling. End spray cooling introduces oil in the rotor-stator air gap. Added oil in the air gap can increase windage losses by about 100% compared to having a dry air gap. Increases in windage loss reduce the efficiency of the electrical machine. In addition, reduced efficiency causes increase rotor winding temperature, which reduces insulation life and mean time between failures (MTBF). As demand for power density for electrical machines increases, the ability to cool the rotor is a limiting factor.

The conventional techniques have been considered satisfactory for their intended purpose. However, there is an ever present need for improved cooling for electrical machines. This disclosure provides a solution for this need.

SUMMARY OF THE INVENTION

A rotor for an electrical machine includes a core including a plurality of rotor poles circumferentially spaced apart from one another about a hub. A winding is wound about the rotor poles. The winding passes longitudinally through a respective winding gap between each circumferentially adjacent pair of rotor poles. A cooling tube extends through at least one of the respective winding gaps.

A respective wedge can be seated in each of the respective winding gaps separating a first bundle of the winding from a second bundle of the winding in each of the respective winding gaps. The cooling tube can be between the wedge and the winding. The cooling tube can be between one of the rotor poles and the winding. The winding can include an end winding extending around a respective axial end of each of the rotor poles, wherein the cooling tube wraps along the end winding outboard of the winding. The cooling tube can wrap along the end winding inboard of the winding.

The cooling tube can be intermingled with individual conductor strands within a bundle of the winding. The cooling tube can extend through a common insulative sheath with the winding, wherein the insulative sheath lines each bundle of the winding within the respective winding gaps. The cooling tube can include multiple passes through the insulative sheath, each pass being intermingled with individual conductor strands of the bundle of the winding. The cooling tube can be constrained to resist centrifugal forces from rotation of the rotor core by at least one of the winding, the rotor core, and/or a rotor wedge between circumferentially adjacent ones of the poles.

An outer shaft can extend axially within the hub for common rotation with the hub. An inner shaft can extend axially within the outer shaft for common rotation with the hub, wherein a first end of the cooling tube is connected in fluid communication with an inner flow passage of the inner shaft. A second end of the cooling tube can be connected in fluid communication with an inner flow passage of the outer shaft. The inner passages of the inner and outer shafts can be fluidly isolated from one another for one-way flow of cooling fluid through the cooling tube.

The cooling tube can be one of a plurality of cooling tubes, each extending through a respective winding gap, and each having a respective first end in fluid communication with the inner flow passage of the inner shaft and a respective second end in fluid communication with the inner flow passage of the outer shaft. The cooling tube can wind through the respective winding gap multiple in multiple passes.

An electrical machine includes a stator and a rotor as described in any of the embodiments above. The rotor is operatively connected to the stator for rotation relative to the stator.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
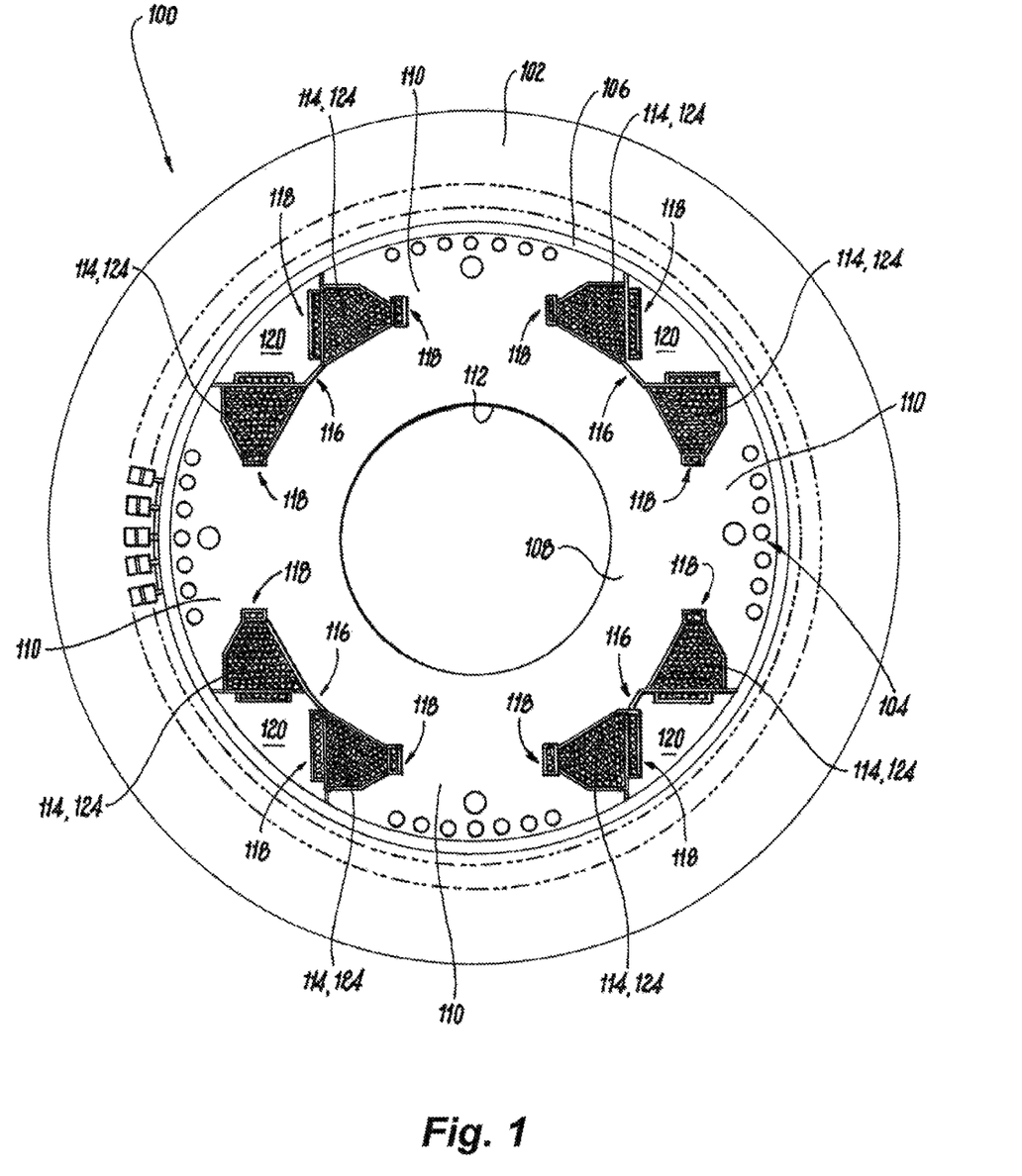
FIG. 1 is a cross-sectional axial end view of an exemplary embodiment of an electrical machine constructed in accordance with the present disclosure, showing the rotor, rotor windings, and schematically showing locations for cooling tubes.

Reference will now be made to the drawings wherein like reference numerals identify similar structural features or aspects of the subject disclosure. For purposes of explanation and illustration, and not limitation, a partial view of an exemplary embodiment of an electrical machine in accordance with the disclosure is shown in FIG. 1 and is designated generally by reference character 100. Other embodiments of electrical machines in accordance with the disclosure, or aspects thereof, are provided in FIGS. 2-6, as will be described. The systems and methods described herein can be used to provide cooling for windings in electrical machines (such as generators, motors, or starter motor generators), which can increase efficiency of electrical machines, and improve mean time between failures (MTBF) relative to traditional configurations.

The electrical machine 100 includes a stator 102 with a rotor 104 that is operatively connected to the stator 102 for rotation relative to the stator 102. An air gap 106 radially separates the stator 102 from the rotor 104. The rotor 104 includes a core 108 including a plurality of rotor poles 110 circumferentially spaced apart from one another about a hub 112. While four poles 110 are shown, those skilled in the art will readily appreciate that any suitable number of poles can be used without departing from the scope of this disclosure. A winding 114, e.g. a main field winding, is wound about the rotor poles 110. The winding passes longitudinally, i.e. into and out of the viewing plane in FIG. 1, through a respective winding gap 116 between each circumferentially adjacent pair of the rotor poles 110. A respective wedge 120 is seated in each of the respective winding gaps 116 separating a first bundle 124 of the winding 114 from a second bundle 124 of the winding 114 in each of the respective winding gaps 116. Cooling tubes 118 extends through the winding gaps 116. In FIG. 1, the locations of the cooling tubes 118 are indicated schematically.

Figure 2:
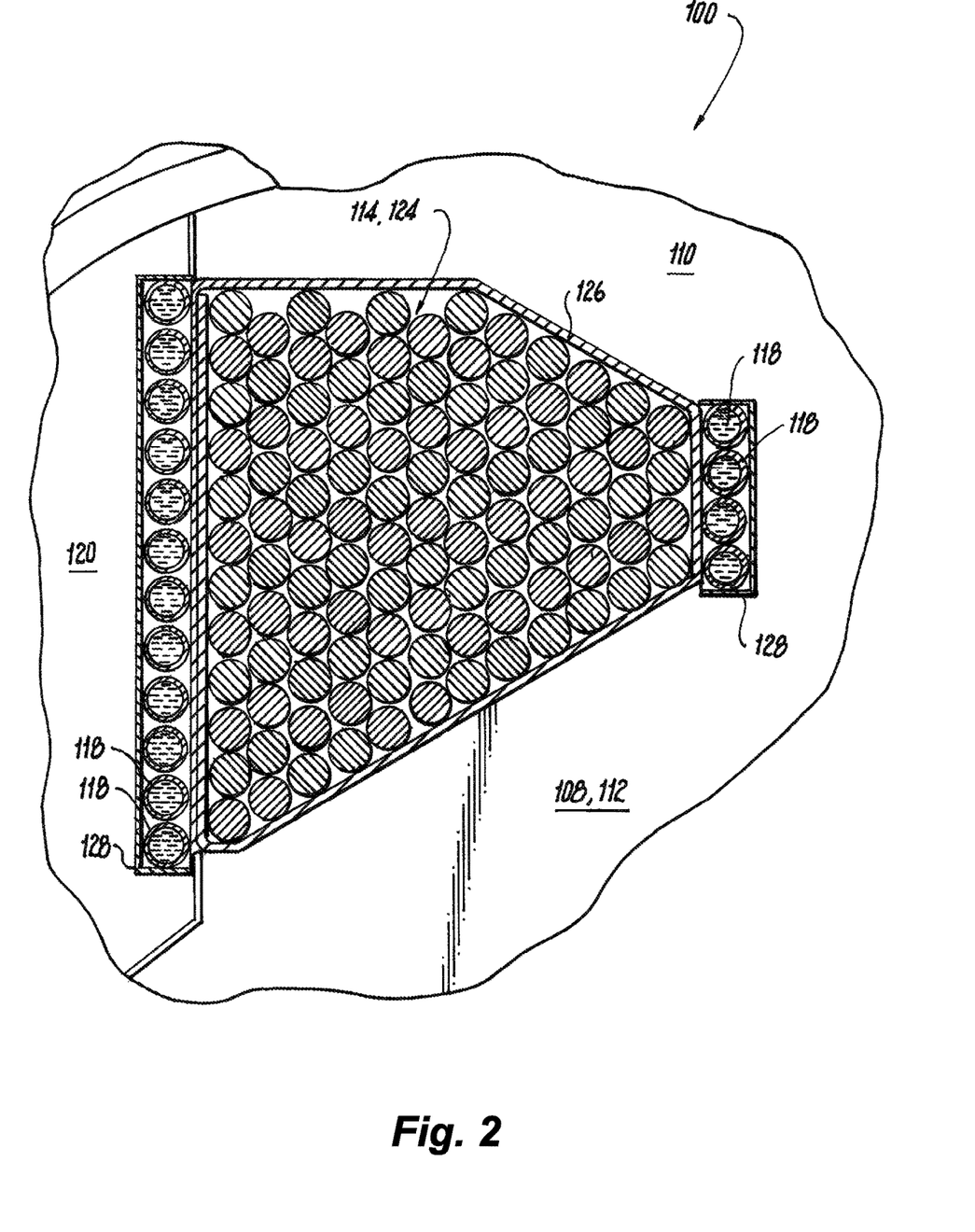
FIG. 2 is a cross-sectional axial end view of a portion of the electrical machine of FIG. 1, showing the cooling tubes.
Figure 3:
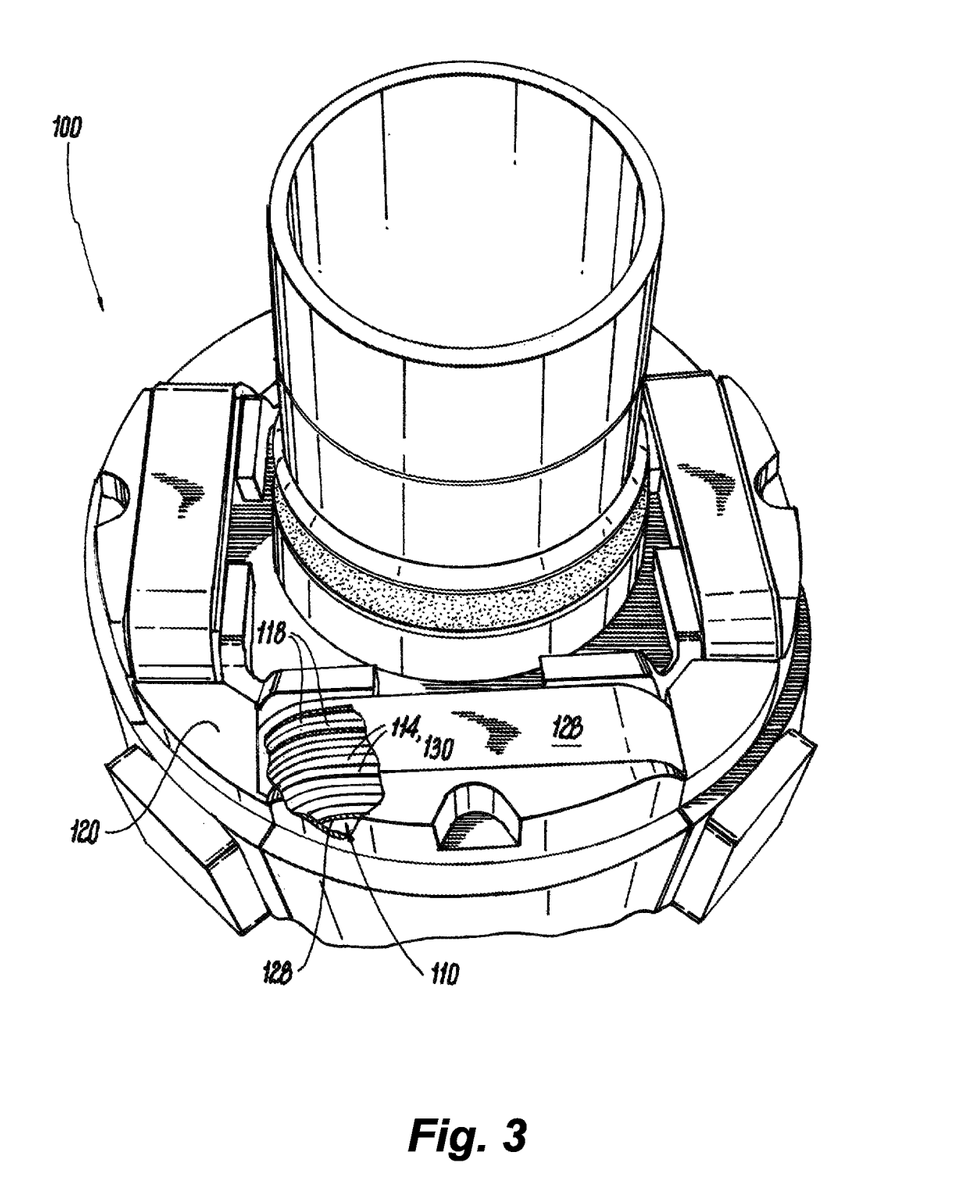
FIG. 3 is a perspective view of a portion of the electrical machine of FIG. 1, showing the cooling tubes wrapping around the end windings.

With reference now to FIG. 2, the cooling tubes 118 are between the wedge 120 and the winding 114. The cooling tubes 118 are also between one of the rotor poles 110 and the winding 114. The winding extends through a respective insulative sheath 126 that wraps around the cross-section of each winding bundle 124 within the respective winding gap 116 to insulate the winding 114 from the rotor core 108. The cooling tubes 118 are similarly sheathed within a cooling tube sheath 128. As shown in FIG. 3, the winding 114 includes an end winding 130 extending around each respective axial end of each of the rotor poles 110. The cooling tubes 118, within sheath 128, wrap along the end winding 130 outboard of the winding 114. The cooling tubes 128, within the inner portion of the sheath 128, also wrap along the end winding 130 inboard of the winding 114. The cooling tube 118 is constrained to resist centrifugal forces from rotation of the rotor core 108 by at least one of the winding 114, the rotor core 108, and/or a rotor wedge 120 between circumferentially adjacent ones of the poles 110. Each circle of cooling tube 118 shown in FIG. 2 can be a separate cooling tube 118, or a single pass of a multiple pass cooling tube 118.

Figure 4:
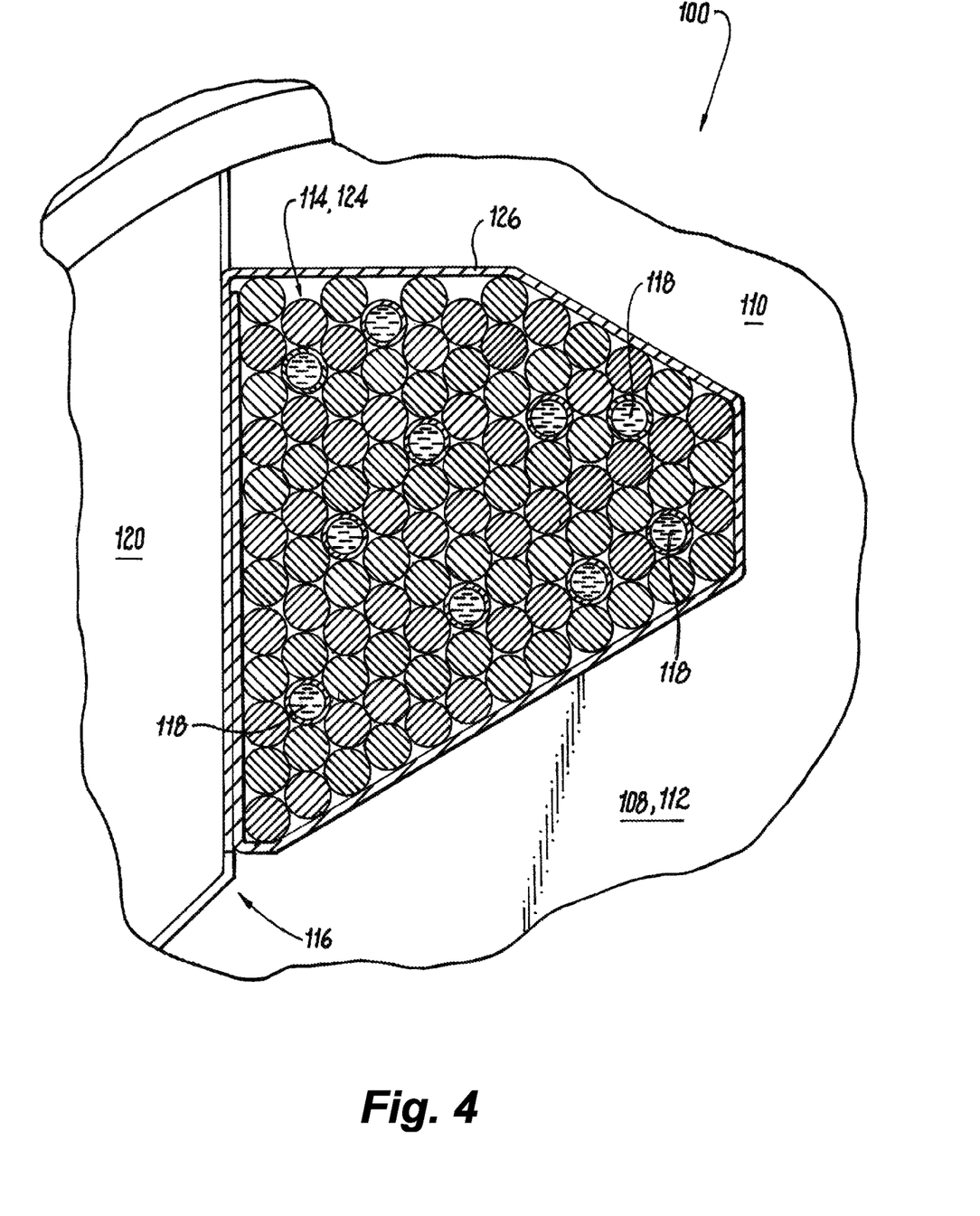
FIG. 4 is a cross-sectional axial end view of a portion of the electrical machine of FIG. 1, showing another configuration of the cooling tubes.

With reference now to FIG. 4, in another configuration of rotor 104, the cooling tube 114 is intermingled with individual conductor strands, i.e., each strand is shown as a circle in FIG. 4, within a bundle 124 of the winding 114. The cooling tube 118 extends through a common insulative sheath 126 with the winding 114, wherein the insulative sheath 126 lines each bundle 124 of the winding within the respective winding gaps 116. The cooling tube 118 can include multiple passes, e.g., each circle of cooling tube 118 in FIG. 4 can be a single pass of the same cooling tube 118, through the insulative sheath 126, wherein each pass is intermingled with individual conductor strands of the bundle 124 of the winding 114. The cooling tube is constrained to resist centrifugal forces from rotation of the rotor core 108 by the winding 114.

Figure 5:
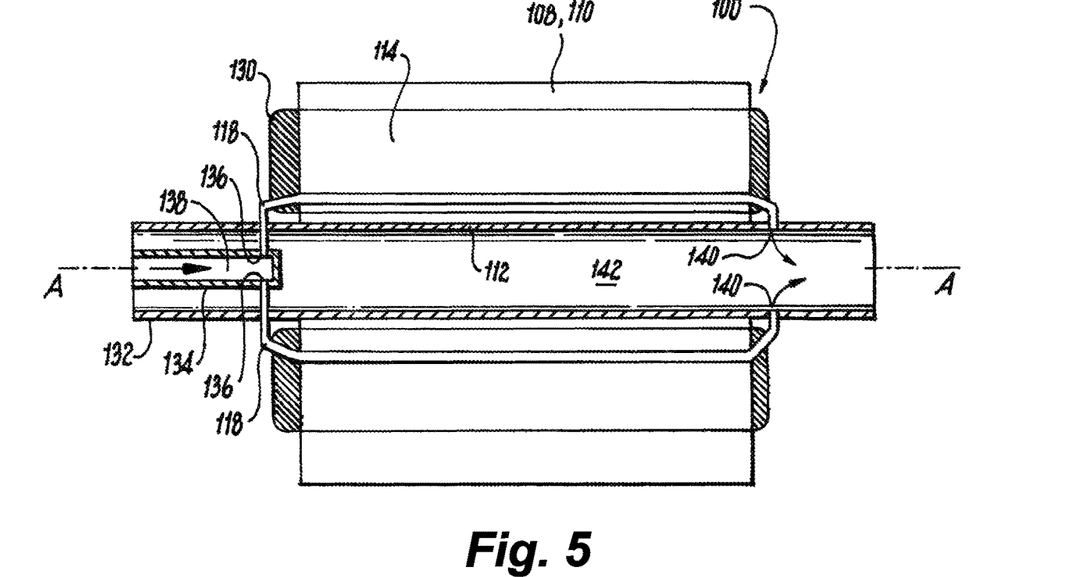
FIG. 5 is a schematic cross-sectional side elevation view of the electrical machine of FIG. 1, showing a flow path for cooling fluid through the cooling tube.

With reference now to FIG. 5, an outer shaft 132 extends axially, i.e. along axis A, within the hub 112 for common rotation with the hub 112. An inner shaft 134 extends axially within the outer shaft 132 for common rotation with the hub 112. A first end 136 of the cooling tube 118 serves as an inlet for the cooling tube 118 and is connected in fluid communication with an inner flow passage 138 of the inner shaft 134. A second end 140 of the cooling tube 118 is connected in fluid communication with an inner flow passage 142 of the outer shaft 132. The inner passages 138, 142 of the inner and outer shafts 134, 132 are fluidly isolated from one another for one-way flow of cooling fluid through the cooling tube 118, as indicated by the flow arrows in FIG. 5. This single pass tube configuration of FIG. 5 can be used with either the tube configuration shown in FIG. 2 or the configuration shown in FIG. 4, wherein each circular cross-section of cooling tube 118 in FIGS. 2 and 4 represents a separate, single pass cooling tube 118. In addition, the single pass cooling tube 118 as shown in FIG. 5 could connect to parallel cooling tubes 118 as shown in FIG. 2 by any suitable header arrangement.

Figure 6:
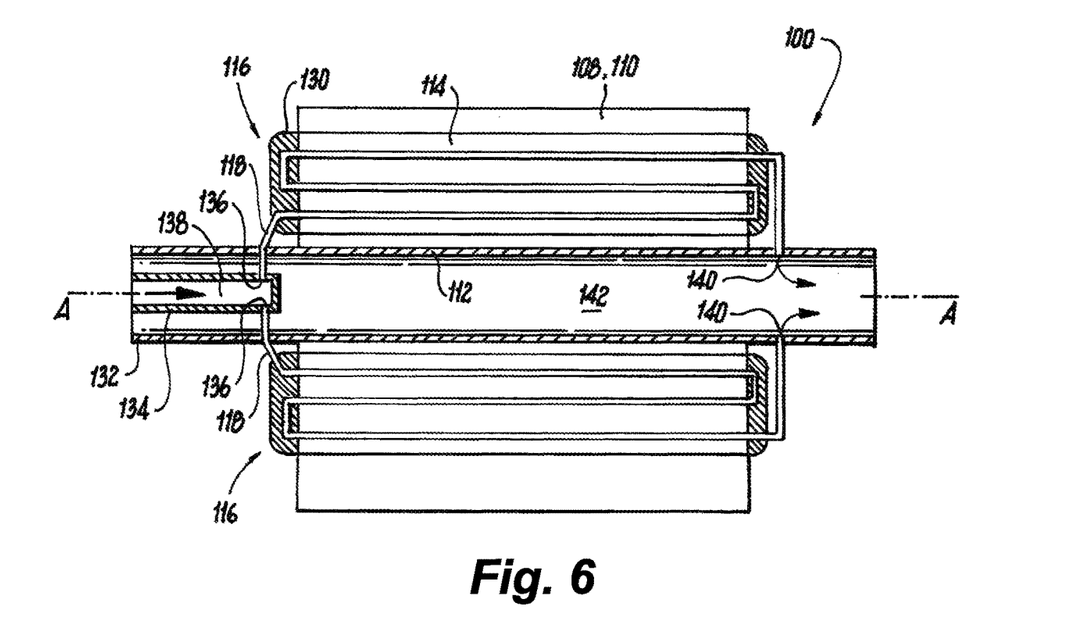
FIG. 6 is a cross-sectional side elevation view of the electrical machine of FIG. 1, showing another embodiment of cooling tubes with multiple passes.

Referring now to FIG. 6, a multiple pass tube configuration is shown. In this configuration, the cooling tube 118 is one of a plurality of cooling tubes 118, each extending through a respective winding gap 116 (e.g. in FIG. 6 two winding gaps are shown, each with a respective cooling tube 118). Each cooling tube 118 has a respective first 136 end in fluid communication with the inner flow passage 138 of the inner shaft 134 and a respective second end 140 in fluid communication with the inner flow passage 142 of the outer shaft 132. Each cooling tube 118 winds through the respective winding gap 116 multiple in multiple passes, e.g., three passes as shown in FIG. 6 or any other suitable number of passes. The inner passages 138, 142 of the inner and outer shafts 134, 132 are fluidly isolated from one another, as described above, for multiple pass flow of cooling fluid through the cooling tubes 118, as indicated by the flow arrows in FIG. 6. The multiple pass tube configuration of FIG. 6 can be used with either the tube configuration shown in FIG. 2 or the configuration shown in FIG. 4, wherein each circular cross-section of cooling tube 118 in FIGS. 2 and 4 represents a separate, single pass of a multiple pass cooling tube 118. In either of the configurations shown in FIGS. 5 and 6, the ends 136 and 140 of each cooling tube 118 can be ultrasonically welded to the respective shaft 132, 134.

Cooling tube configurations as shown and described herein embed cooling tubes in rotor windings and/or within the winding gaps of a rotor core. This allows cooling to be by direct conduction from winding wires or strands to the cooling tubes and does not require fins in the rotor core or winding gaps as in traditional configurations. This also provides liquid cooling of rotor windings while maintaining the air gap, e.g. air gap 106, free of liquid coolant. This disclosure allows for a dry cavity generator, with reduced windage loss and improved efficiency relative to traditional configurations. This also reduces rotor temperatures and increases mean time between failures (MTBF).

The methods and systems of the present disclosure, as described above and shown in the drawings, provide for rotor cooling with superior properties including increased electrical machine efficiency and improved MTBF relative to traditional configurations. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A rotor for an electrical machine, comprising:
   a core including a plurality of rotor poles circumferentially spaced apart from one another about a hub;
   a winding wound about the rotor poles, wherein the winding passes longitudinally through a respective winding gap between each circumferentially adjacent pair of rotor poles; and
   a cooling tube extending through at least one of the respective winding gaps, wherein the cooling tube is intermingled with individual conductor strands within a bundle of the winding, wherein the cooling tube extends through a common insulative sheath with the winding, wherein the insulative sheath lines each bundle of the winding within the respective winding gaps.

2. The rotor as recited in claim 1, further comprising a respective wedge seated in each of the respective winding gaps separating a first bundle of the winding from a second bundle of the winding in each of the respective winding gaps, wherein the cooling tube is between the wedge and the winding.

3. The rotor as recited in claim 1, further comprising a respective wedge seated in each of the respective winding gaps separating a first bundle of the winding from a second bundle of the winding in each of the respective winding gaps, wherein the cooling tube is between one of the rotor poles and the winding.

4. The rotor as recited in claim 1, wherein the winding includes an end winding extending around a respective axial end of each of the rotor poles, wherein the cooling tube wraps along the end winding outboard of the winding.

5. The rotor as recited in claim 1, wherein the winding includes an end winding extending around a respective axial end of each of the rotor poles, wherein the cooling tube wraps along the end winding inboard of the winding.

6. The rotor as recited in claim 1, wherein the cooling tube includes multiple passes through the insulative sheath, each pass being intermingled with individual conductor strands of the bundle of the winding.

7. The rotor as recited in claim 1, wherein the cooling tube is constrained to resist centrifugal forces from rotation of the rotor core by at least one of the winding, the rotor core, and/or a rotor wedge between circumferentially adjacent ones of the poles.

8. A rotor for an electrical machine, comprising:
a core including a plurality of rotor poles circumferentially spaced apart from one another about a hub;
a winding wound about the rotor poles, wherein the winding passes longitudinally through a respective winding gap between each circumferentially adjacent pair of rotor poles;
a cooling tube extending through at least one of the respective winding gaps,
an outer shaft extending axially within the hub for common rotation with the hub; and
an inner shaft extending axially within the outer shaft for common rotation with the hub, wherein a first end of the cooling tube is connected in fluid communication with an inner flow passage of the inner shaft, and wherein a second end of the cooling tube is connected in fluid communication with an inner flow passage of the outer shaft, wherein the inner passages of the inner and outer shafts are fluidly isolated from one another for one-way flow of cooling fluid through the cooling tube.

9. The rotor as recited in claim 8, wherein the cooling tube is one of a plurality of cooling tubes, each extending through a respective winding gap, and each having a respective first end in fluid communication with the inner flow passage of the inner shaft and a respective second end in fluid communication with the inner flow passage of the outer shaft.

10. The rotor as recited in claim 8, wherein the cooling tube winds through the respective winding gap multiple in multiple passes.

11. An electrical machine comprising:
a stator; and
a rotor operatively connected to the stator for rotation relative to the stator, wherein the rotor includes:
a core including a plurality of rotor poles circumferentially spaced apart from one another about a hub;
a winding wound about the rotor poles, wherein the winding passes longitudinally through a respective winding gap between each circumferentially adjacent pair of rotor poles; and
a cooling tube extending through at least one of the respective winding gaps, wherein the cooling tube is intermingled with individual conductor strands within a bundle of the winding, wherein the cooling tube extends through a common insulative sheath with the winding, wherein the insulative sheath lines each bundle of the winding within the respective winding gaps.

12. The electrical machine as recited in claim 11, further comprising a respective wedge seated in each of the respective winding gaps separating a first bundle of the winding from a second bundle of the winding in each of the respective winding gaps, wherein the cooling tube is between the wedge and the winding.

13. The electrical machine as recited in claim 11, further comprising a respective wedge seated in each of the respective winding gaps separating a first bundle of the winding from a second bundle of the winding in each of the respective winding gaps, wherein the cooling tube is between one of the rotor poles and the winding.

14. The electrical machine as recited in claim 11, wherein the winding includes an end winding extending around a respective axial end of each of the rotor poles, wherein the cooling tube wraps along the end winding outboard of the winding.

15. The electrical machine as recited in claim 11, wherein the winding includes an end winding extending around a respective axial end of each of the rotor poles, wherein the cooling tube wraps along the end winding inboard of the winding.

16. The electrical machine as recited in claim 11, wherein the cooling tube includes multiple passes through the insulative sheath, each pass being intermingled with individual conductor strands of the bundle of the winding.

17. A rotor for an electrical machine, comprising:
a core including a plurality of rotor poles circumferentially spaced apart from one another about a hub;
a winding wound about the rotor poles, wherein the winding passes longitudinally through a respective winding gap between each circumferentially adjacent pair of rotor poles; and
a cooling tube extending through at least one of the respective winding gaps, wherein the cooling tube is intermingled with individual conductor strands within a bundle of the winding, wherein the cooling tube includes multiple passes through an insulative sheath, each pass being intermingled with individual conductor strands of the bundle of the winding.

18. An electrical machine comprising:
a stator; and
a rotor operatively connected to the stator for rotation relative to the stator, wherein the rotor includes:
a core including a plurality of rotor poles circumferentially spaced apart from one another about a hub;
a winding wound about the rotor poles, wherein the winding passes longitudinally through a respective winding gap between each circumferentially adjacent pair of rotor poles; and a cooling tube extending through at least one of the respective winding gaps, wherein the cooling tube is intermingled with individual conductor strands within a bundle of the winding, wherein the cooling tube includes multiple passes through an insulative sheath, each pass being intermingled with individual conductor strands of the bundle of the winding.

\* \* \* \* \*